(12) United States Patent
Holman et al.

(10) Patent No.: US 7,730,680 B2
(45) Date of Patent: Jun. 8, 2010

(54) MODULAR MONOLITHIC BULKHEAD PANEL

(75) Inventors: Wrenn P. Holman, Tacoma, WA (US); Robert W. Dost, Kent, WA (US); Ernest E. Williams, Jr., Kenmore, WA (US); Gary L. Richter, Port Orchard, WA (US); Juan Villalobos, Fort Worth, TX (US); Yida Gonzalez, Seattle, WA (US); Michael H. Volkmar, Tacoma, WA (US); Michael Byrd, Tacoma, WA (US); Francisco J. Boyer, Redmond, WA (US); Nasima Rahman, Issaquah, WA (US); William L. Saylor, Renton, WA (US); Patricia M. Hutchinson, Renton, WA (US); Chad L. Braunschweig, Sumner, WA (US); David J. Bauder, Kent, WA (US)

(73) Assignee: The Boeing Company, Chicago, IL (US)

( * ) Notice: Subject to any disclaimer, the term of this patent is extended or adjusted under 35 U.S.C. 154(b) by 1224 days.

(21) Appl. No.: 11/284,733

(22) Filed: Nov. 22, 2005

(65) Prior Publication Data

US 2006/0101771 A1 May 18, 2006

Related U.S. Application Data

(63) Continuation-in-part of application No. 10/066,163, filed on Jan. 31, 2002, now abandoned.

(60) Provisional application No. 60/276,563, filed on Mar. 14, 2001.

(51) Int. Cl.
*E06B 1/00* (2006.01)

(52) U.S. Cl. .......................... 52/210; 52/204.1; 52/212; 52/213; 52/204.71; 52/653.1

(58) Field of Classification Search ............... 52/204.1, 52/210, 213, 211, 204.5, 204.54, 204.71, 52/309.1, 309.4–309.8, 633, 648.1, 652.1, 52/404.1, 405.2, 407.4, 404.2
See application file for complete search history.

(56) References Cited

U.S. PATENT DOCUMENTS

| | | | | |
|---|---|---|---|---|
| 1,048,988 A | * | 12/1912 | Mayo | 52/212 |
| 3,141,205 A | * | 7/1964 | Russell | 49/147 |
| 3,378,951 A | | 4/1968 | Malone, Jr. | |
| 3,788,019 A | * | 1/1974 | Kiselewski | 52/212 |
| 3,934,382 A | | 1/1976 | Gartung | |
| 4,179,849 A | * | 12/1979 | Kuffner | 49/505 |
| 4,185,437 A | | 1/1980 | Robinson | |
| 4,238,913 A | | 12/1980 | Holmes | |
| 4,261,146 A | | 4/1981 | Holmes | |
| 4,557,961 A | | 12/1985 | Gorges | |
| 4,679,366 A | * | 7/1987 | Hitchins | 52/217 |
| 4,708,336 A | | 11/1987 | Riblet | |
| 4,758,336 A | | 7/1988 | Bock et al. | |
| 4,783,941 A | * | 11/1988 | Loper et al. | 52/235 |
| 4,894,955 A | * | 1/1990 | Metz | 49/504 |

(Continued)

*Primary Examiner*—Jeanette Chapman
(74) *Attorney, Agent, or Firm*—Harness, Dickey & Pierce, P.L.C.

(57) ABSTRACT

A modular monolithic metal framed bulkhead panel having an outer frame, an inner frame, a non-metallic composite panel, a panel seal, and a frame seal common to a panel-bulkhead structure interface.

27 Claims, 7 Drawing Sheets

U.S. PATENT DOCUMENTS

| | | | |
|---|---|---|---|
| 6,013,361 A * | 1/2000 | Seal et al. ................ | 428/297.4 |
| 6,170,422 B1 | 1/2001 | Macander et al. | |
| 6,510,807 B2 | 1/2003 | Gottfried | |
| 6,550,193 B2 * | 4/2003 | Potts ........................ | 52/204.1 |
| 7,093,470 B2 | 8/2006 | El-Soudani | |
| 7,300,693 B2 | 11/2007 | Albers | |
| 7,344,108 B2 | 3/2008 | Muylaert | |
| 7,371,451 B2 | 5/2008 | Messinger | |
| 2002/0178583 A1 | 12/2002 | Holman | |
| 2005/0051255 A1 | 3/2005 | Nordman | |

\* cited by examiner

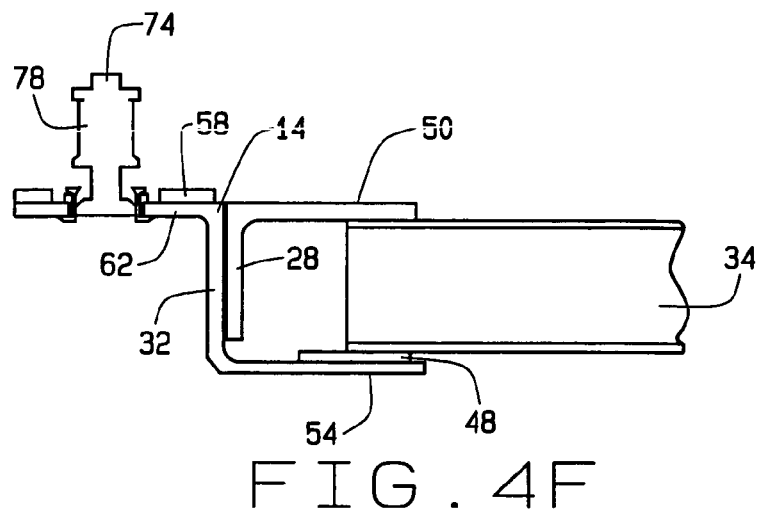
FIG.4F
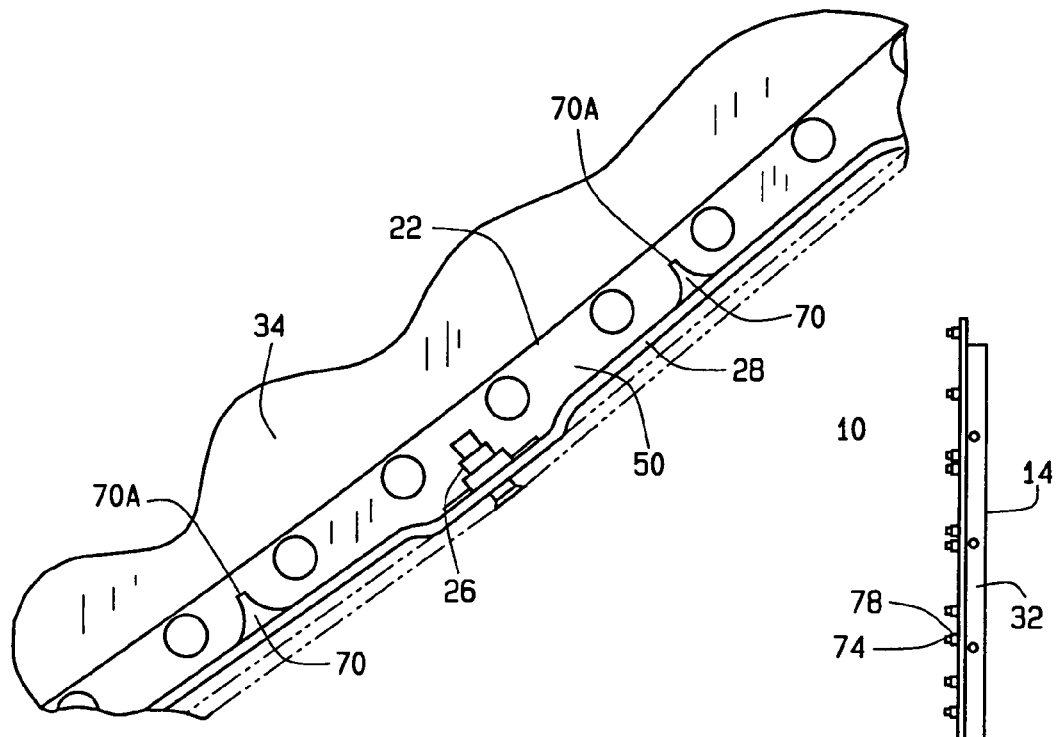
FIG.4G
FIG.4H

MODULAR MONOLITHIC BULKHEAD PANEL

CROSS REFERENCE TO RELATED APPLICATIONS

This application is a continuation of U.S. patent application Ser. No. 10/066,163 filed on Jan. 31, 2002 now abandoned, which claims priority from provisional application Ser. No. 60/276,563, filed Mar. 14, 2001. The disclosures of the above applications are incorporated herein by reference.

FIELD OF INVENTION

The present invention relates to panel structures and more particularly to panel structures of the type used in aircraft bulkheads.

BACKGROUND OF THE INVENTION

Typical compartment bulkheads used on aircraft are designed utilizing non-metallic composite hybrid thermosetting phenolic resin sandwich panels that can be peripherally framed or not, depending on the space and design requirements unique to each bulkhead location. Framed panels are used in areas where aircraft structures do not allow sufficient edge margin space typically required for non-framed monolithic composite panels. Framed panels are also used in areas where extreme heat resistance and low smoke vapor toxicity emissions are required, or where the panel will be frequently removed in service, such as a maintenance access cover, and where fastener hole wear resistance is required. Framed panels are used to prevent face sheets from delaminating from the composite panel core resulting from in service abuse.

Exemplary of prior art panel structures utilized in aircraft is U.S. Pat. No. 4,557,961 to Gorges issued Dec. 10, 1985 and assigned to The Boeing Company.

The state of the art metal-framed panel designs are labor intensively built from multiple details which include machined parts, stretch formed parts, profiled extrusions, blanked sheet metal parts, non-metallic subassemblies and associated standards. Fabrication of the panel assemblies usually requires large tools to hold the panel periphery while the assembly of the panels is completed so that the edge margin alignment is maintained. Splice plates or integrated overlaps are required to attach one segment of the frame to another and all of these frame splices are completed using fasteners. Existing designs usually require a post assembly drilling operation utilizing drill templates or numerical control programs in efforts to provide controlled fastener patterns. Once the frames have been assembled, additional labor intensive operations are required to seal and finish the panel, i.e., masking, local trimming, local primer touch up, enamel application and silicon sealing.

BRIEF SUMMARY OF THE INVENTION

Disclosed is a modular monolithic cost-effective metal-framed bulkhead panel design. According to one aspect of the invention, the novel assembly reduces part count. According to another aspect of the invention, the novel assembly eliminates hard tooling requirements. According to yet another aspect of the invention, the novel assembly reduces fabrication time and inventory requirements. According to still another aspect of the invention, the novel assembly allows for easy replacement of any component of this assembly that is damaged during handling or use. According to still yet another aspect of the invention, the novel assembly provides a robust reliable design by preventing the face sheets from delaminating from the honeycomb core resulting from in service abuse. The present monolithic bulkhead panel providing the above features and advantages utilizes a unique combination of only five basic components hereinafter described in detail.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein:

FIG. 4F is exemplary of a cross-sectional portion of the modular monolithic bulkhead panel at line A-A of FIG. 4B;

FIG. 4G is exemplary view of an isolated section of the modular monolithic bulkhead panel at section E-E of FIG. 4C illustrating nutplates and indexing features included in the inner frame;

FIG. 4H is exemplary of a side view of the modular monolithic bulkhead panel.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
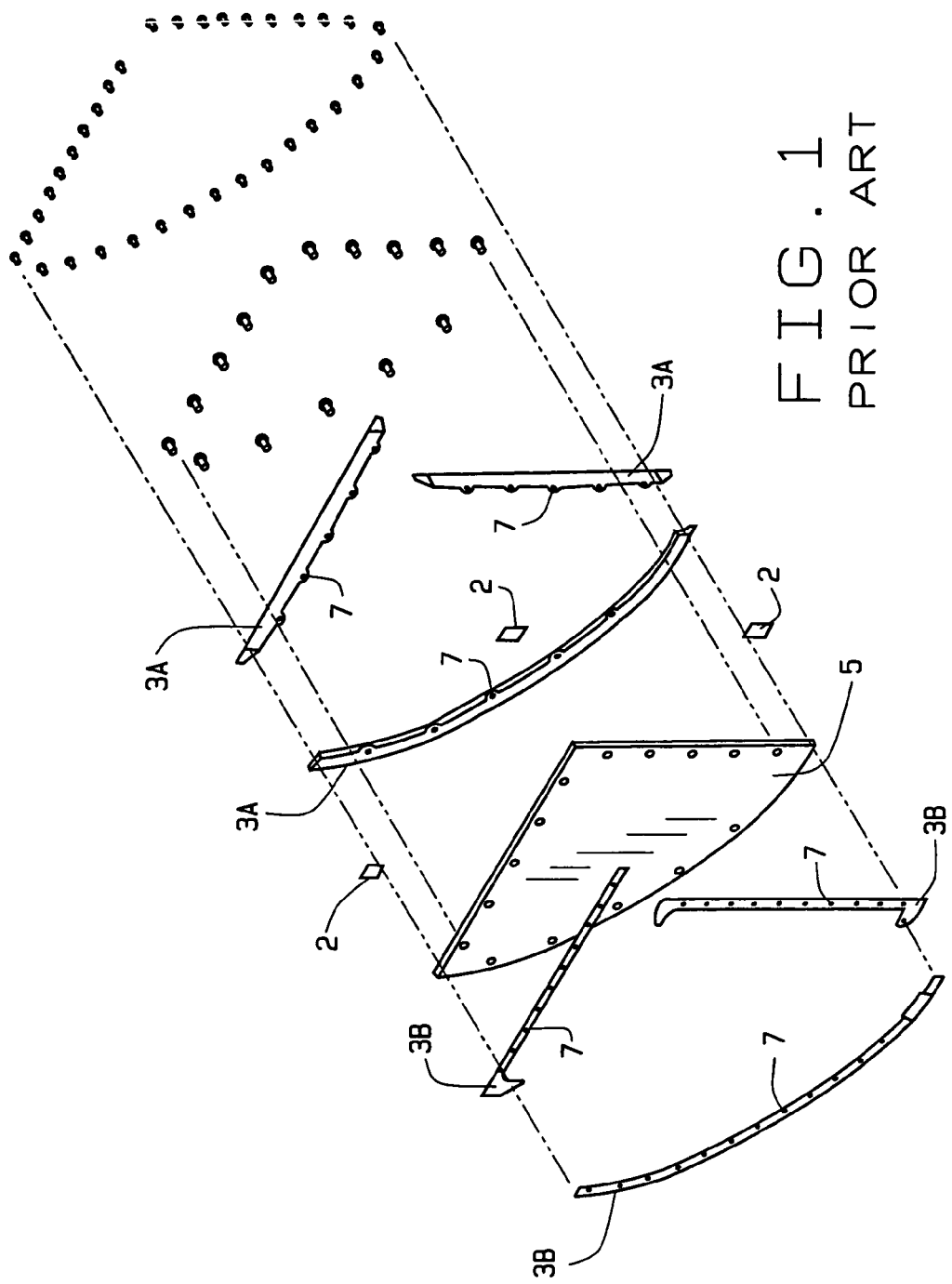
FIG. 1 is an exploded view of a prior art panel design.
Figure 2:
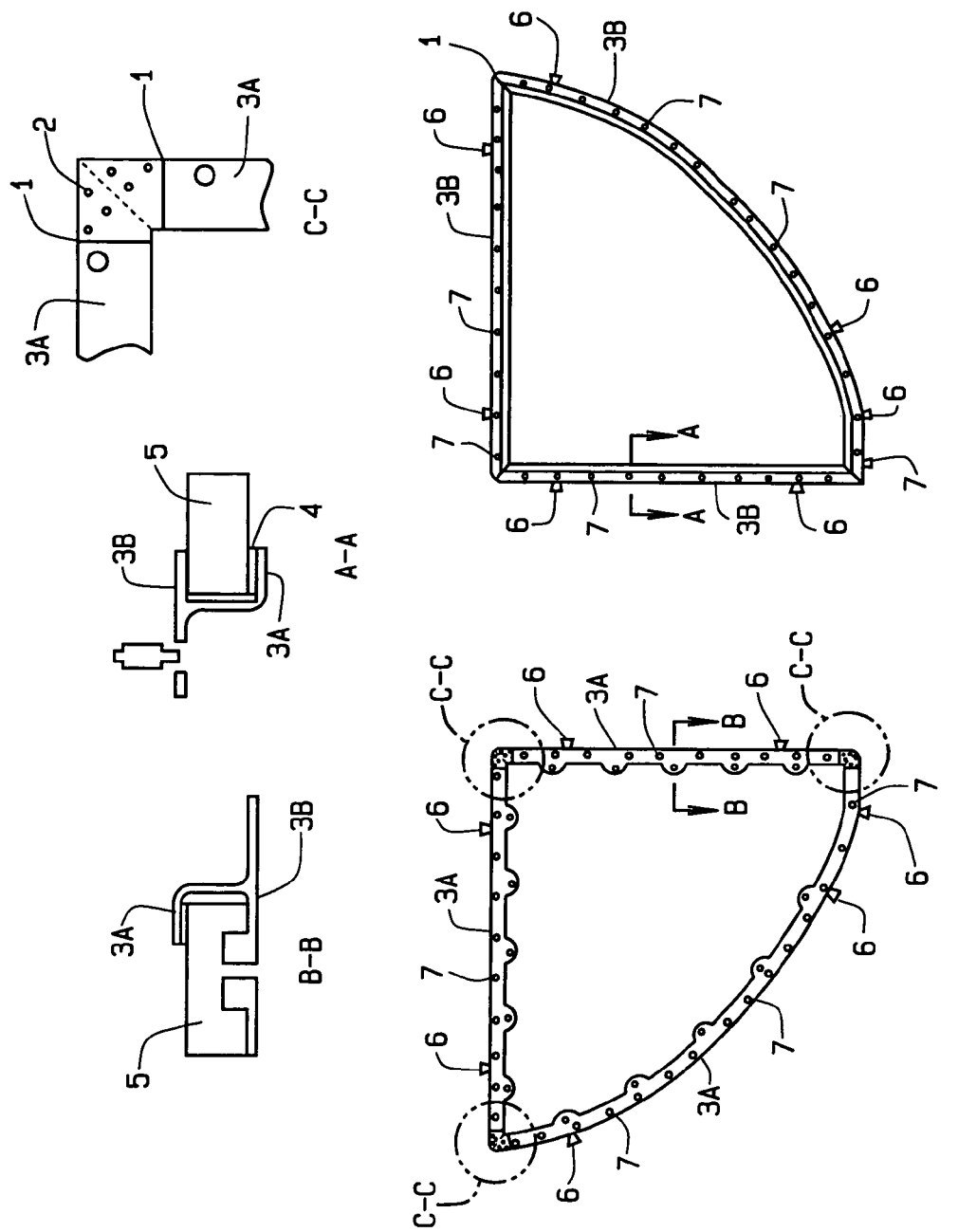
FIG. 2 is exemplary of the prior art multiple part panel design.

Turning now to the drawings, there is shown in FIGS. 1 and 2 a prior art metal-framed panel structure of multiple part design. Prior art metal framed panels structures, such as that shown in FIGS. 1 and 2, typically utilize a secondary sealing operation, performed after the panels are framed, to fill gaps 1 between splice plates 2 and a front flange section 3A of a panel frame. Additionally, prior art metal framed panel structures typically utilize a secondary sealing operation, performed after the panels are framed, to fill gaps 4 between the front frame flange 3A and the panel assembly 5. Furthermore, prior art metal framed panel structures typically require that the panels 5 be masked prior to a post assembly enamel paint application to the front flange section 3A and rear flange section 3B. Further, prior art metal framed panel structures typically require tooling index points 6 along the outer edge of the frame to ensure adequate edge margins during assembly. Still further, prior art metal framed panel structures typically require pilot holes 7, for coupling the frame sections, to be hand drilled and finished as a secondary operation, performed after the panels are framed.

Turning now to FIGS. 3 and 4A through 4H, the present invention provides a robust cost effective modular monolithic bulkhead panel (MMBP) 10 that eliminates labor intensive assembly processes and reduces part counts, fabrication costs and inventory requirements. The MMBP 10 allows for fabrication and final protective finishes to be incorporated at the detail level, i.e., prior to assembly of the MMBP 10. Additionally, the assembly of the MMBP 10 can be accomplished on a bench with standard hand tools utilizing standard hardware. Thus, the MMBP 10 greatly reduces reoccurring assembly labor. The detail part count of the MMBP 10 is reduced over the prior art designs, thereby reducing fabrication time and lowering associated inventory cost. Furthermore, components of the MMBP 10, as described below, can be easily replaced should they become damaged during handling or use.

The MMBP 10 comprises an outer frame 14 constructed to support fire worthiness directives addressing material degradation. The MMBP 10 additionally includes an inner frame 22 sized to fit within the outer frame 14. In various embodiments, the inner frame 22 includes a plurality of integral nutplates 26. The integral nutplates 26, best shown in FIGS. 4D and 4G, are spaced along and connected to an interior side of a coupling leg 28 of the inner frame 22. Thus, the integral nutplates 26 are hidden from view once the composite panel 34 and inner frame 22 are inserted within the outer frame 14, as described below. The integral nutplates 26 receive and engage frame fasteners 30 to couple the inner frame 22 to the outer frame 14. Particularly, the frame fasteners 30 are inserted through preformed holes spaced along a hip 32 of the outer frame 14 and engage the nutplates 26 to couple the inner frame 22 to the outer frame 14 within the outer frame hip 32. The frame fasteners can be any suitable fastener, for example threaded fasteners or a rivets. Alternatively, the inner and outer frames 22 and 14 can be coupled together using any suitable coupling means. For example, an adhesive can be applied between the inner and outer frames 22 and 14, or the inner and outer frames 22 and 14 can be welded together after a non-metallic hybrid composite panel 34 has been positioned between the inner and outer frames 22 and 14, as described below.

Figure 3:
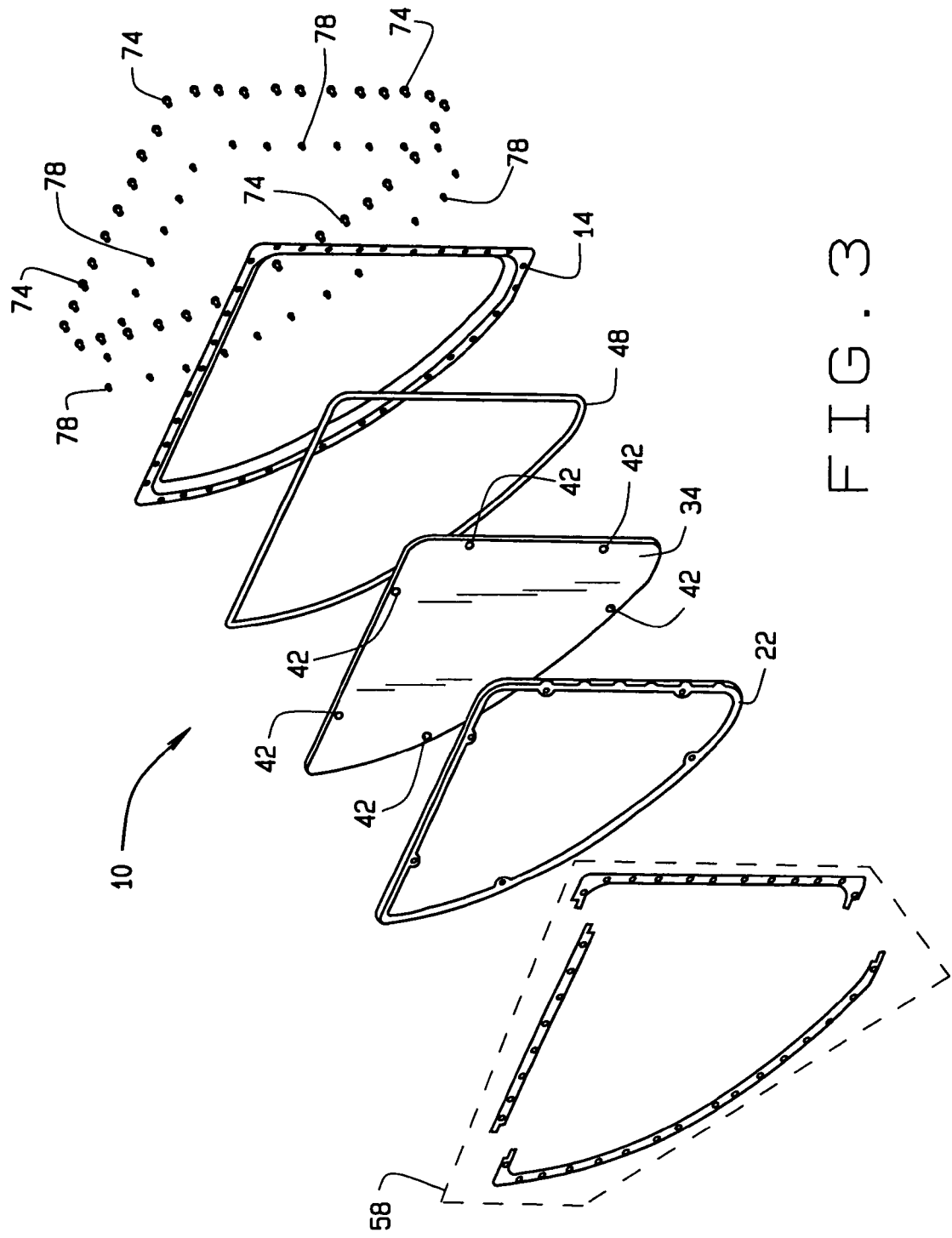
FIG. 3 is an exploded view of a modular monolithic bulkhead panel embodying the present invention.

The inner and outer frames 22 and 14 are coupled together to retain the non-metallic hybrid composite panel 34 between the inner and outer frames 22 and 14. In various embodiments, the composite panel 34 can be of a thermosetting sandwich construction. For example, the composite panel 34 can include a plurality of plys, e.g., layers, comprising woven graphite fabric and high temperature phenolic resin sandwiched together and thermally set to form the composite panel 34. More specifically, the hybrid composite panel 34 can be fabricated utilizing any combination of suitable materials such as graphite, carbon fiber reinforced plastic, Kevlar, an aramid fiber pre-impregnated material, fiberglass, or a glass reinforced plastic material. Generally, the inner and outer frames 22 and 14 are coupled together to form a two-piece 'h' shaped channel retention and mounting frame for retaining the hybrid composite panel 34. As best shown in FIGS. 3 and 4D, the composite panel 34 includes a plurality of fastener receivers 42 cured within floating potted inserts 38 spaced along a periphery of the composite panel 34. Thus, the fastener receivers 42 are fixedly coupled to the composite panel 34, via the potted inserts 38. Panel fasteners 46 can be inserted through preformed holes spaced along a panel retaining leg 50 of the inner frame 22 and engaged with the fastener receivers 42 to couple the composite panel 34 to the inner frame 22.

In various embodiments, a panel seal, or gasket, 48 is positioned between a panel retaining leg 54 of the outer frame 14 and the composite panel 34 to fill any gaps between the composite panel 34 and the outer frame panel retaining leg 54. The panel seal 48 is formed to fit along the panel retaining leg within the outer frame hip 32. The panel seal 48 can be a one-piece seal or be comprised of multiple interlocking seal segments. The panel seal 48 can be fabricated of any material suitable to fill any gap between the composite panel 34 and the outer frame panel retaining leg 54 and satisfy structural and safety requirements of the environment in which the MMBP 10 is to be utilized. For example, in various embodiments, the panel seal 48 can be fabricated of a suitable elastomer, silicone or silicone foam material. In various embodiments, the panel seal 48 is fabricated of a high temperature cure silicone, or alternatively a cold temperature cure silicone. Furthermore, in various embodiments, the panel seal 48 includes an adhesive backing to affix the panel seal 48 to an inner surface of the outer frame panel retaining leg 54 prior to positioning the composite panel 34 within the outer frame 14.

The outer and inner frames 14 and 22 can be constructed of any material suitable to satisfy structural and safety requirements of the environment in which the MMBP 10 is to be utilized. For example, in various embodiments the outer and inner frames 14 and 22 can be constructed of a metal or a composite material. Metallic outer and inner frames 14 and 22 can be constructed using a machining process, a casting process, or a drawn process. Additionally, in various embodiments the outer and inner frames 14 and 22 can be constructed of a metal having a uniform internal grain structure, or a directed internal grain structure to enhance strength of the outer and inner frames 14 and 22. Furthermore, as shown throughout FIGS. 3 and 4A though 4H, all holes in the inner and outer frames 22 and 14, needed for assembly of the MMBP 10, are formed prior to assembling the MMBP 10, as described herein. For example, the holes in the inner frame 22 for inserting the panel fasteners 46 through to fasten the composite panel 34 to the inner frame 22 are formed prior to assembly of the MMBP 10. Likewise, the holes in the outer frame hip 32 and the inner frame coupling leg 28, through which the frame fasteners 30 are inserted, are formed prior to assembly of the MMBP 10.

Figure 5:
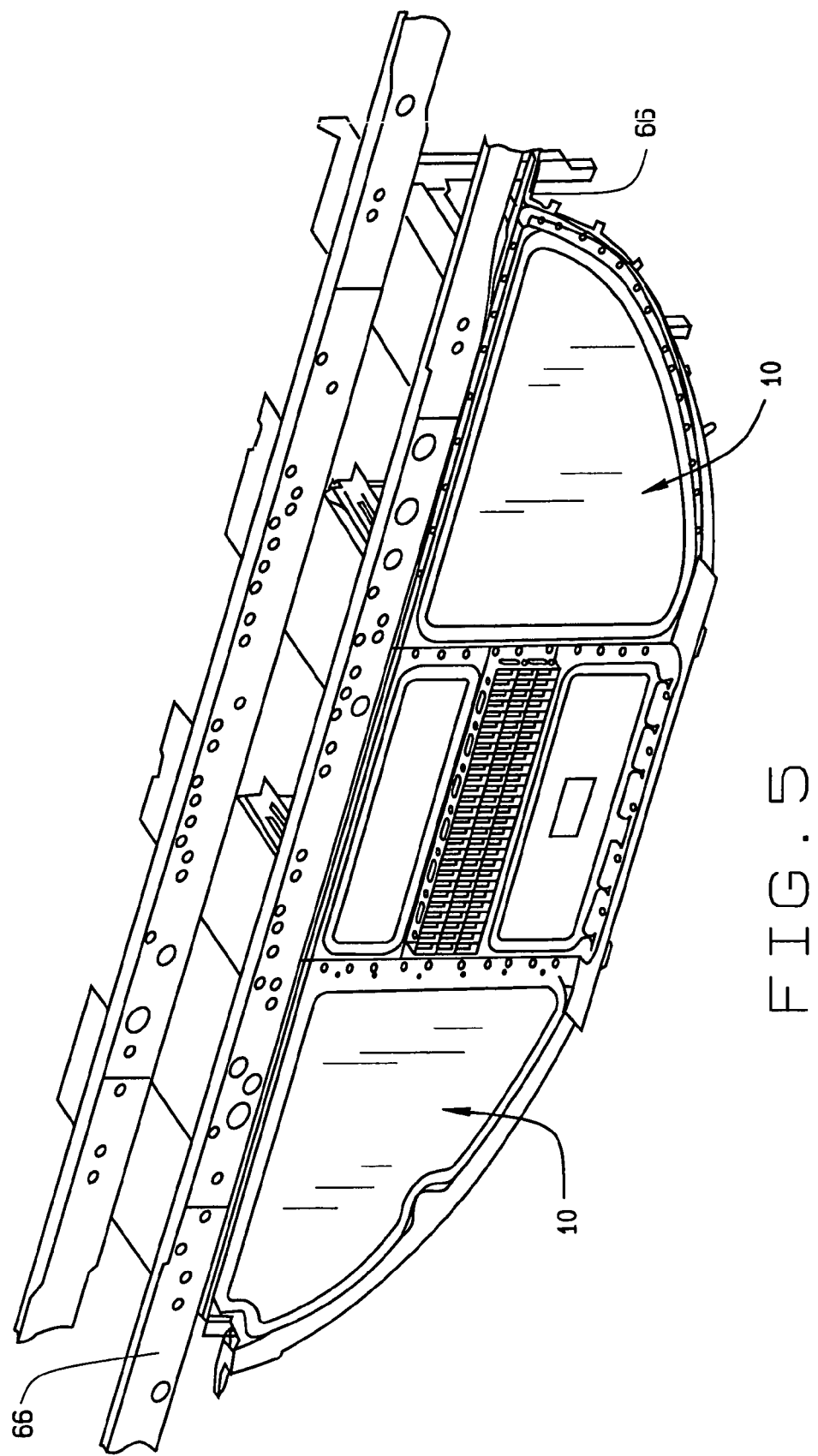
FIG. 5 is a perspective view of the present invention in the compartment bulkhead structure of an aircraft.

The MMBP 10 further includes a frame seal 58 affixed to a MMBP mounting leg 62 of the outer frame 14 used to mount the assembled MMBP 10 to a bulkhead compartment structure 66, shown in FIG. 5. The frame seal 58 can comprise a one-piece seal or be comprised of multiple interlocking seals. In various embodiments, the frame seal 58 can be an adhesive backed seal. In various embodiments, the outer frame 14 is machined from aluminum plate that is complete with all of the required hardware and final finishes. Similarly, in various embodiments, the inner frame 22 is machined from aluminum plate and comes with the required hardware and final finishes.

Figure 4A:
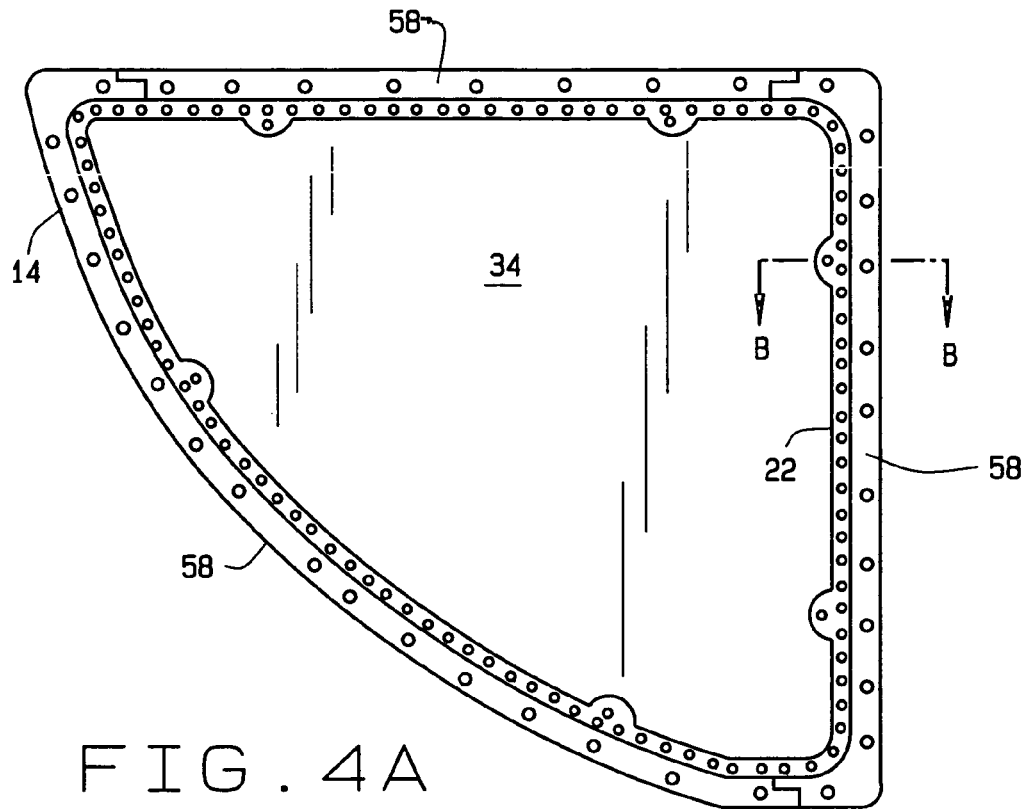
FIG. 4A is exemplary of a front view of the modular monolithic bulkhead panel showing an inner frame within the perimeter of an outer frame having a sectional seal affixed thereto, in accordance with the present invention.
Figure 4B:
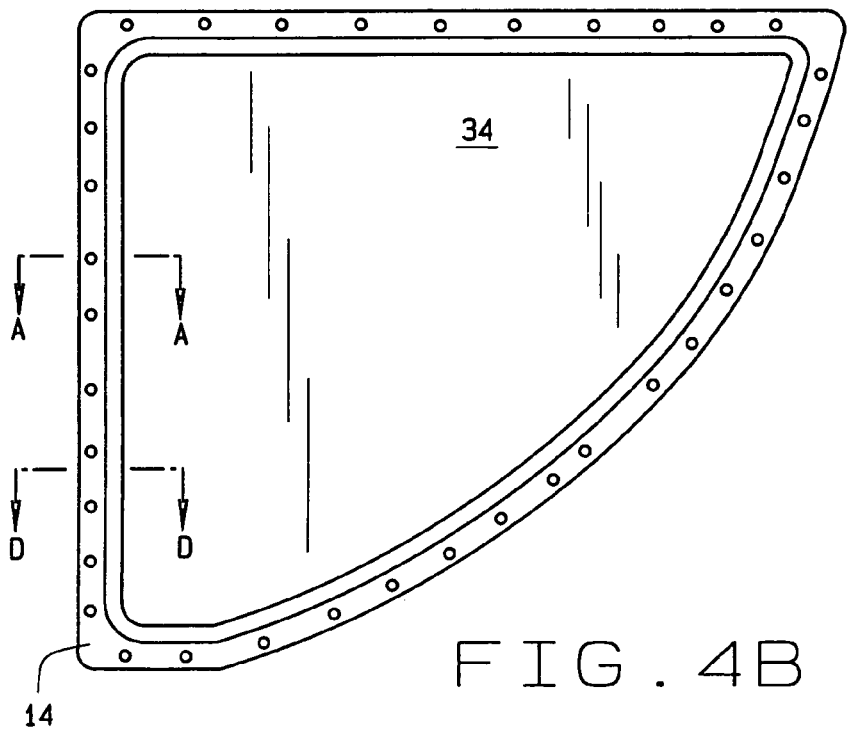
FIG. 4B is exemplary of a rear view of the modular monolithic bulkhead panel showing the outer frame, in accordance with the present invention.
Figure 4C:
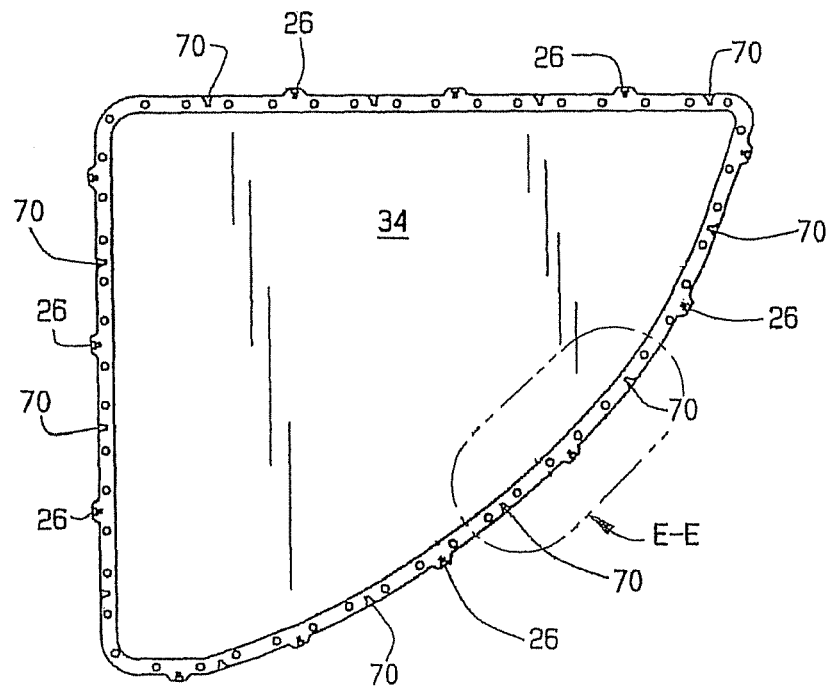
FIG. 4C is exemplary of a rear view of the modular monolithic bulkhead panel with the outer frame removed to show the inner frame.
Figure 4D:
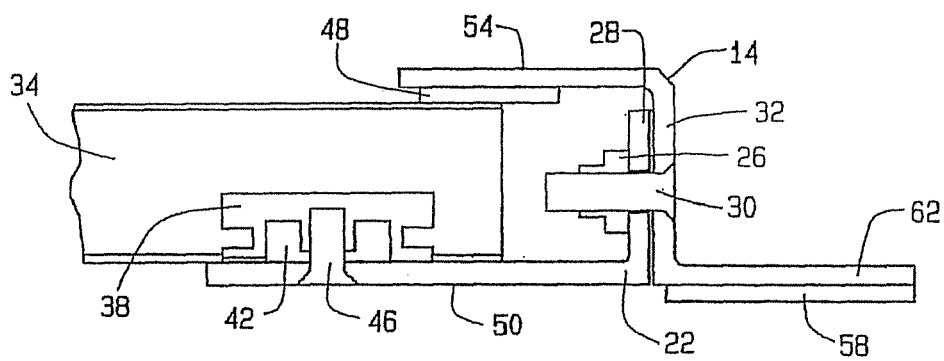
FIG. 4D is exemplary of a cross-sectional portion of the modular monolithic bulkhead panel at line B-B of FIG. 4A.
Figure 4E:
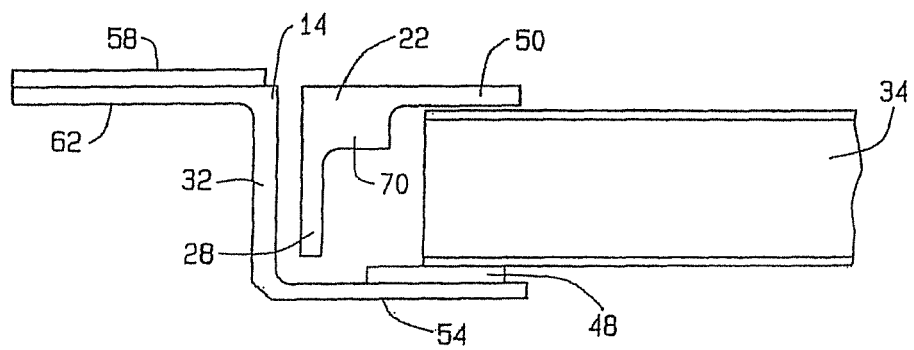
FIG. 4E is exemplary of a cross-sectional portion of the modular monolithic bulkhead panel at line D-D of FIG. 4B.

Additionally, in various embodiments, the inner frame 22 includes a plurality of integral panel indexing features 70, best shown in FIGS. 4C, 4E and 4G, that ensure alignment of the non-metallic hybrid composite panel 34 during the assembly process of the MMBP 10. Misalignment of the non-metallic hybrid composite panel 34 could compromise the resilience, i.e., resistance, of the MMBP 10 to fire and smoke propagation effects. The indexing features 70 are raised bodies formed and spaced apart along an inner side of the entire inner frame panel retaining leg 50. The indexing features 70 position the composite panel 34 within the tips 70A of the indexing features 70, thereby ensuring alignment of the non-metallic hybrid composite panel 34 between the inner and outer frames 22 and 14. As described above, the non-metallic hybrid composite panel 34 includes floating potted inserts 38, which also aid in the assembly process of the MMBP 10. In various embodiments, the panel seal 48 is peripherally precut to support simple application by fabrication center mechanics during the assembly process of the MMBP 10. Furthermore, the entire MMBP 10 can be assembled by fabrication personnel utilizing standard fasteners and hand tools.

The method of assembly of the MMBP 10 includes utilizing a first frame, e.g., the outer frame 14, for holding the composite panel 34. Then, a second frame, e.g., the inner frame 22, is utilized to retain the composite panel 34 within the first frame. A gasket, such the panel seal 48, is utilized for sealing the joint between the composite panel 34 and the first and second frames. More particularly, the panel seal 48 is inserted into the outer frame 14, i.e., affixed to the outer frame retaining leg 54, for sealing any gap between the composite panel 34 and the outer frame 14. The composite panel 34 is then positioned within outer frame hip 32 and onto the panel seal 48. The inner frame 22 is then positioned within the outer frame hip 32 and placed around the edge of the composite panel 34 whereby the indexing features 70 properly align the composite panel 34 between the inner and outer frames 22 and 14. The composite panel 34 can then be fastened to the inner frame panel retaining leg 50, via the fastener receivers 42 secured within the floating potted inserts 38 and the panel fastener 46. The first and second metal frames are then joined together to retain the composite panel therebetween, using, for example, the nutplates 26 and the frame fasteners 30. The panel gasket 58 can then be positioned on the outer frame MMBP mounting leg 62 and thereafter, the assembled MMBP 10 can be coupled to the bulkhead structure 66.

FIG. 5 is illustrative of two MMBP's 10 shown coupled the compartment bulkhead structure 66, for example, a compartment bulkhead structure of an aircraft Each MMBP 10 can be secured to the bulkhead structure 66 utilizing standard fasteners, such as quarter turn fasteners 74 and stanchions 78, and hand tools.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A modular monolithic bulkhead panel for an aircraft, comprising:
a first frame having a hip portion and a mounting leg extending non-parallel to said hip portion;
a composite panel positioned within the hip portion of the first frame and having a plurality of fastener receivers cured within potted inserts spaced along a periphery of the composite panel;
a second frame positioned around the composite panel and within the hip portion of the first frame;
the second frame including a plurality of preformed holes spaced along a panel retaining leg of the second frame for receiving therethrough a plurality of panel fasteners engageable with the fastener receivers to fasten the second frame to the composite panel;
the first and second frames each including a plurality of holes;
a plurality of frame fasteners for securing the first and second frames together; and
the mounting leg being adapted to be secured to structure of the aircraft.

2. The panel of claim 1, wherein the second frame includes a plurality of indexing features spaced apart and formed along a retaining leg of the second frame.

3. The panel of claim 1, wherein the second frame includes a plurality of nutplates spaced along an interior side of a coupling leg of the second frame.

4. The panel of claim 3, wherein the holes of the first frame are spaced along the hip portion of the first frame for receiving therethrough the plurality of frame fasteners engageable with the nutplates to couple the first frame to the second frame and thereby the composite panel between the first and second frames.

5. The panel of claim 1, wherein the panel further includes a seal positioned along a panel retaining leg of the first frame between the composite panel and the first frame panel retaining leg.

6. The panel of claim 5, wherein the seal comprises one of a silicone seal and a silicone foam seal.

7. The panel of claim 5, wherein the seal comprises an adhesive backing.

8. A modular monolithic bulkhead panel (MMBP) for an aircraft, comprising:
a first frame including a plurality of preformed holes spaced along a hip portion of the first frame, and a mounting leg projecting from the hip portion;
a second frame sized to fit within the hip portion of the first frame and including a plurality of nutplates spaced along an interior side of a coupling leg of the second frame, the nutplates aligning with the preformed holes in the first frame hip portion such that a plurality of frame fasteners are insertable through the preformed holes and engageable with the nutplates to couple the first frame to the second frame;
a composite panel retained between a panel retaining leg of the first frame and a panel retaining leg of the second frame, the composite panel having a plurality of fastener receivers cured within potted inserts spaced along a periphery of the composite panel; and
the mounting leg adapted to be secured to a structure of the aircraft to secure the modular, monolithic bulkhead panel to the aircraft.

9. The panel of claim 8, wherein the second frame includes a plurality of indexing features spaced apart and formed along the panel retaining leg of the second frame.

10. The panel of claim 9, wherein the second frame includes a plurality of preformed holes spaced along the panel retaining leg of the second frame for receiving therethrough a plurality of panel fasteners engageable with the fastener receivers to fasten the second frame to the composite panel.

11. The panel of claim 10, wherein the panel further includes a seal positioned along the first frame panel retaining leg between the composite panel and the first frame retaining leg.

12. The panel of claim 11, wherein the seal comprises one of a silicone seal and a silicone foam seal.

13. The panel of claim 11, wherein the seal comprises an adhesive backing.

14. A method of assembling a modular monolithic bulkhead panel for use in an airborne mobile platform, the method comprising:
    positioning a composite panel within a first frame, the first frame having a mounting leg;
    positioning a second frame having a plurality of spaced apart, preformed holes, adjacent the first frame and around the edge of the composite panel utilizing a plurality of indexing features formed along a retaining leg of the second frame to properly align the composite panel between the inner and outer frames; and
    using a plurality of fasteners to secure the composite panel and the first frame together.

15. The method of claim 14, wherein the positioning a second frame adjacent the first frame comprises positioning a hip portion of the first frame against a coupling leg of the second frame.

16. The method of claim 14, wherein the positioning a second frame adjacent the first frame comprises positioning a hip portion of the first frame against a coupling leg of the second frame, wherein the coupling leg has a plurality of holes formed therein, and wherein the hip portion has a plurality of holes formed therein, the holes in hip portion and the holes in the coupling leg receiving fastening elements therethrough to couple the hip portion and the coupling leg together.

17. The method of claim 14, wherein the positioning a second frame adjacent the first frame comprises using a plurality of indexing features formed on the retaining leg of the second frame to assist in aligning the composite panel within the first frame.

18. The method of claim 14, further comprising using a plurality of nut plates spaced along an interior side of a coupling leg of the second frame to assist in coupling the first and second frames together.

19. The method of claim 14, further comprising using a seal positioned between an inside surface of a panel retaining leg of the first frame and a surface of the composite window.

20. The method of claim 19, wherein using a seal comprises using a silicone foam seal.

21. The method of claim 14, wherein positioning a composite panel within a first frame comprises positioning a composite panel having a plurality of spaced apart fastener receivers positioned within potted inserts in one surface of the composite panel.

22. A method of assembling a modular monolithic bulkhead panel for use in an airborne mobile platform, the method comprising:
    positioning a composite panel within a first frame, the first frame having a mounting leg, and the composite panel including a plurality of spaced apart fastener receivers positioned within potted inserts in one surface of the composite panel;
    positioning a second frame having a plurality of spaced apart, preformed holes, adjacent the first frame and around the edge of the composite panel utilizing a plurality of indexing features formed along a retaining leg of the second frame to properly align the composite panel between the inner and outer frames;
    using a first plurality of fasteners to secure the second frame to the fastener receivers of the composite panel; and
    using a second plurality of fasteners to secure the first frame and the second frame together.

23. The method of claim 22, wherein positioning a composite panel within a first frame comprises positioning a hip portion of the first frame against coupling leg of the second frame.

24. The method of claim 23, wherein positioning a composite panel within a first frame comprises positioning a composite panel so that a surface of the composite panel is positioned adjacent with a panel retaining leg of the first frame such that the panel retaining leg overlays an edge portion of the composite panel.

25. The method of claim 22, wherein positioning a second frame comprises positioning a second frame with a coupling leg that extends approximately perpendicular to the panel retaining leg of the second frame, such that the coupling leg abuts a hip portion of the first frame.

26. The method of claim 25, further comprising forming each of the coupling leg and the hip portion with a plurality of holes, and securing the coupling leg and the hip portion using the second plurality of fasteners.

27. The method of claim 22, wherein the operation of positioning a composite panel within a first frame comprise positioning a composite panel within a first frame having a mounting leg adapted to be secured to structure of the mobile platform, and a hip portion adapted to be secured to the second frame, and a panel retaining leg adapted to overlay an edge portion of the composite panel, with the mounting leg and the panel retaining leg each being formed so as to extend generally perpendicular to the hip portion.

* * * * *